United States Patent [19]

Jacobson

[11] 4,109,547
[45] Aug. 29, 1978

[54] DETENT MECHANISM
[75] Inventor: Paul D. Jacobson, Pekin, Ill.
[73] Assignee: Caterpillar Tractor Co., Peoria, Ill.
[21] Appl. No.: 759,681
[22] Filed: Jan. 17, 1977
[51] Int. Cl.² .............................................. G05G 5/04
[52] U.S. Cl. ........................................ 74/526; 73/513; 74/528
[58] Field of Search ................ 74/526, 527, 528, 532; 73/513

[56] References Cited
U.S. PATENT DOCUMENTS

| 2,511,095 | 6/1950 | Barnes | 73/513 |
|---|---|---|---|
| 2,961,229 | 11/1960 | Parks | 73/513 |
| 3,225,156 | 12/1965 | Sahrbacker | 74/527 X |
| 3,377,870 | 4/1968 | Miller | 73/513 |
| 3,537,331 | 11/1970 | Rifkin | 74/528 |
| 3,745,762 | 7/1973 | Kocher | 74/527 X |

Primary Examiner—Gary L. Smith
Attorney, Agent, or Firm—Phillips, Moore, Weissenberger, Lempio & Majestic

[57] ABSTRACT

A detent mechanism including a stop pin and a specially configured detent spring provides a recognizable interruption to an operator rotating a control shaft of an engine governor. Increased torque is required to be applied to the shaft to override the detent spring to permit further rotation of the shaft. The detent stop pin is mounted for rotation about the shaft to allow radial positioning of the pin relative to the shaft by a resiliently biased means. The C-shaped detent spring is readily replaceable to provide different tensions for different operating conditions. Fixed stopped means and adjustable stop means limit rotation of the shaft with the detent mechanism operably positioned between the two stops.

8 Claims, 3 Drawing Figures

DETENT MECHANISM

BACKGROUND OF THE INVENTION

This invention relates generally to engine governors used on internal combustion engines and specifically on engines which include a low idle stop effective at a position slightly above a shut off position.

Engine governors of vehicles driven by internal combustion engines generally are set by hand levers or foot pedals. Although the specific purpose of an engine governor is to maintain engine speed at an optimum setting for fuel economy and the like, it is important to provide a governor control system which is easily reset particularly to the idle position. Since it is also advantageous to reduce the number of control devices at the operator station of a vehicle, it is usual to combine functions of such controls as the engine governor and the shut-off mechanism of the internal combustion engine. In lever control systems or pedal control systems the combination of engine governor control and engine shut-off control raises the possibility of inadvertent shut-down of the engine during retardation of the lever or relaxation of the pedal by the operator to achieve a governed idle condition. Accordingly, it has been found that a detent mechanism in the engine governor control system is appropriate to adequately warn the operator of the approach to the shut off setting of the engine governor. The detent precludes inadvertent shut-down of the engine.

Unfortunately, in systems designed for hand lever control the detent mechanism is usually constructed with a spring having a relatively low resistance to torque while the foot pedal operated systems require a relatively high resistance to torque in view of the nature of the system. To construct a system which may be utilized for either a hand lever or foot pedal installation depending upon the ultimate vehicle into which it is installed, requires varying tension of the detent spring. In the past this has required a redesign of the control lever system.

SUMMARY OF THE INVENTION

The present invention is directed to overcoming one or more of the problems as set forth above.

Broadly stated, the invention is an adjustable detent assembly for a control shaft. The assembly comprises a housing having the control shaft mounted therein for rotation in a first and second direction. Collar means are associated with the control shaft for rotation therewith, the collar means having first and second radially extending projections. The first projection defines a radially oriented bore which contains the reciprocally detent means. Included with the detent means are resilient means for urging the detent means radially outwardly. The housing defines fixed stop means for limiting rotation of the control shaft in the first direction and adjustable stop means for limiting rotation of the shaft in second direction. The invention also includes detent stop means positionable circumferentially about the shaft for cooperating with the detent means to provide opposition to rotation of the collar means.

The aforesaid objects and other objects will become more apparent from the study of the accompanying drawings in the following specification.

DETAILED DESCRIPTION OF THE PREFERRED EMBODIMENT

Figure 1:
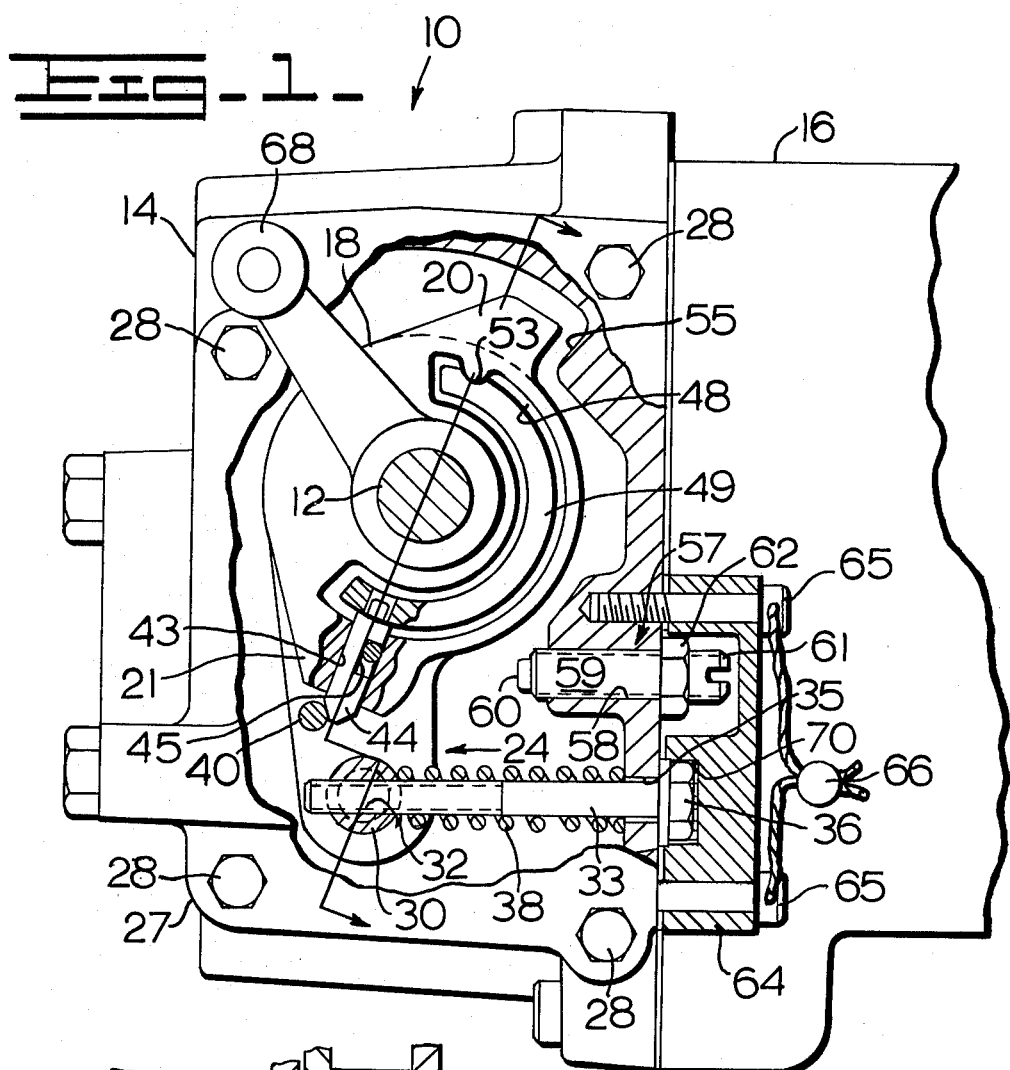
FIG. 1 shows the adjustable detent assembly partly in section which is the subject of this invention.

Referring to FIG. 1, an adjustable detent assembly 10 for a control shaft 12 is shown. Control shaft 12 is envisioned as being operably connected to an engine govenor (not shown) through appropriate linkage. Control shaft 12 is journaled for rotation in a housing 14. The housing 14 in turn may be affixed to a component 16 of the governor system. Affixed for rotation to control shaft 12 is collar means such as a plate forming a collar 18. Control shaft 12 may be prepared in a manner well known in the art such as by knurling for the mounting of collar 18, such knurling 19 is shown representatively in FIG. 2. Other conventional means such as a spline connection, brazing, welding, or keying would also be appropriate. Collar 18 is formed with two radially extending projections 20 and 21, the purpose of which will become more apparent. Disposed on either side of collar 18 are plates 23 and 24. In FIG. 1 it should be noted that plate 23 has been removed to show the structure of collar 18. A cover 27 is affixed to housing 14 by appropriate means such as bolts 28. Cover 27 is formed to include appropriate bearing means 26 (see FIG. 2) to allow rotation of shaft 12. Plates 23 and 24 have passing therethrough an adjustable pivot pin 29 having an enlarged center portion 30 which effectively holds the pivot pin 29 between the two plate members 23 and 24 when cover 27 is affixed to the housing. The enlarged center portion 30 defines therethrough a cross bore 32 threadably adapted to receive a bolt 33. Bolt 33 pierces housing 14 through a bore 35 so that the head 36 of bolt 33 is exterior of the housing 14. A resilient member in the form of helical spring 38 is positioned about bolt 33 between housing 14 and enlarged center portion 33 so that with bolt 33 threadably engaged with the pivot pin 29, the pivot pin 29 is urged leftwardly as shown in FIG. 1 away from bore 35, with such leftward movement constrained by head 36 contacting housing 14.

Extending between plate 23 and plate 24 generally axially aligned with shaft 12 is a detent stop pin 40. Detent stop pin 40 is retained in its position by conventional retainer rings 41 placed in grooves formed in pin 40 in a manner well known in the art. It should be apparent that rotation of bolt 33 in one direction or the other direction will rotate relatively plates 23 and 24 and consequently detent stop pin 40 about shaft 12. It is, of course, understood that due to the constraints of hole 35 such relative motion of detent stop pin 40 about shaft 12 is limited.

A radial bore 43 is formed in projection 21 of collar 18. Reciprocally mounted in radial bore 43 is a detent 44 having its axis normal to the axis of detent stop pin 40. Detent 44 has a cutaway mid-portion 45 allowing a pin 46 to be inserted in a transverse bore 47 defined in collar 18 and the intercepting radial bore 43. Pin 46 serves to retain detent 44 in radial bore 43 while allowing limited reciprocal movement of the detent. Pin 46 is retained in bore 47 by plate 24. Collar 18 is formed with an arcuate groove 48 which allows positioning of a C-shaped resilient member 49 which itself defines proximate one end a bore 50 in which a reduced diameter portion of detent 44 may be received. Resilient member 49 is formed to urge detent 44 radially outwardly of radial bore 44 so that the extreme end of detent 44 will contact detent stop pin 40. Detent 44 is formed at its extreme end proximate stop pin 40 with beveled faces 51 which facilitate reciprocation of detent 44 inwardly of the radial bore 43 upon contacting detent stop pin 40 thereby allowing rotation of control shaft 12 and collar 18 upon application of increased torque. Resilient member 49 has formed at the end opposite bore 50 a notch 53 formed to fit a similar shaped projection in arcuate groove 48 to prevent rotation of resilient member 49 in the arcuate groove 48.

Housing 14 is formed with two additional stop means, a fixed stop means 55 adapted to engage projection 20 upon clockwise rotation of control shaft 12 as seen in FIG. 1. In addition, an adjustable stop means 57 is associated with housing 14 to engage projection 21 upon counter-clockwise rotation of control shaft 12 and collar 18 as shown in FIG. 1. Adjustable stop means 57 is comprised of a bore 58 in housing 14 having disposed therein a threaded member 59. The threaded member defines at one end an anvil 60 and at the other end means for rotation in this case a slotted head 61 adapted for a screw driver. A lock nut 62 may be disposed on threaded member 59 to maintain threaded member in a particular orientation relative the housing. It is to be understood that rotation of threaded member 59 in one direction advances anvil 60 to the left as indicated in FIG. 1 while rotation of threaded member 59 retracts anvil 60 relative to housing. Both threaded member 59 and head 36 of bolt 33 project through adjacent portions of the housing 14. Accordingly, a cover 64 properly bored to receive both threaded member 59 and head 36 is engageable with housing 14 by conventional means such as bolts 65. The fastening means retaining cover 64 on housing 14 may be formed for use with means to prevent rotation of these fastening means such as safety wire. The safety wire may also include provision for a seal 66 to properly seal the governor setting.

Figure 2:
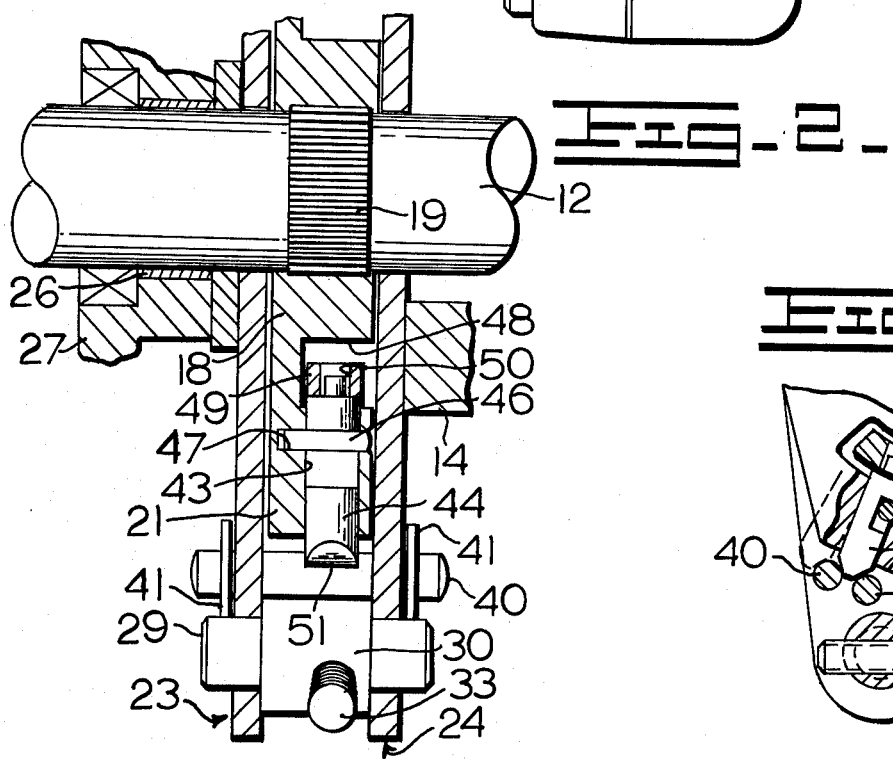
FIG. 2 shows a portion of the detent assembly taken at section line II—II of FIG. 1.

Operation of the detent mechanism as structured in FIG. 1 and 2 is as follows. It is to be understood that the shaft 12 which is movable by a lever 68 through appropriate linkage from the operator station (not shown) of the vehicle is shown in FIG. 1 in what is commonly called the "low-idle" position for an engine governor. Rotation of lever 68 in a clockwise direction so that detent 44, after being urged inwardly of bore 43 by stop pin 40, is positioned on the lefthand side of the detent stop pin as shown in FIG. 1 with projection 20 engaging fixed stop 55 would be the "stopped" position. Rotation of lever 68 in a counter-clockwise direction so that projection 21 engages anvil 60 of adjustable stop means 57 would be at the "high idle" or maximum governed speed.

Further, operation of the governor detent mechanism should be apparent from the above description of the structure. However, it is considered appropriate to again mention at this time the resilient member 49 may be specifically chosen with a degree of resiliency appropriate to the installation. For example, in hand lever controlled governor devices the resiliency of C-shaped resilient member 49 could be relatively lower than a corresponding C-shaped resilient member utilized in a foot pedal operated engine governor. In addition to the operation of the detent 44 and detent stop pin 40 as described above, which provides the recognizable increase in torque to rotate shaft 12, the detent stop pin 40 may be repositioned by rotation of bolt 33 in one direction or the other. This is accomplished by removal of the seal 66 and the associated safety wire and extraction of the bolts holding cover 64 in place. The function of helical spring 38 placed about bolt 33 is now apparent. Helical spring 38 as previously mentioned, urged plates 23 and 24 away from the bore 35 in the housing. Without cover 64 in place and without a helical spring 38, bolt 33 would be free to move outwardly of housing 14 upon rotation of shaft 12 with detent 44 on the left side of detent stop pin 40. Helical spring 38 is designed with sufficient resiliency to prevent movement of plates 23 and 24 upon rotation of shaft 12 with cover 64 removed. This allows maintenance personnel to set the detent stop pin 40 at the "low idle" position. At the same time the high idle position may be set by rotation of the adjustable stop means 57. Once these two settings are made, cover 64 may be replaced and seal 66 reinstalled so that neither adjustable stop means 57 nor bolt 33 will be disturbed. The bore 70 in cover 64 may be purposely made in the form of a hexagonal opening adapted to receive the corresponding hexagonal head of bolt 33. Such an arrangement prevents rotation of bolt 33 once cover 64 is reinstalled. Minimum clearance between head 36 and cover 64 is provided to prevent travel of bolt 33 upon engagement of detent 44 with detent stop pin 40.

Figure 3:
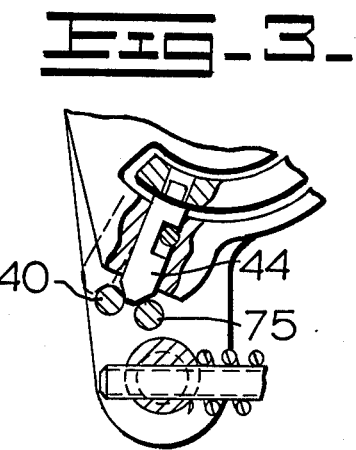
FIG. 3 shows an alternate embodiment with a second stop pin.

In FIG. 3, the same detent mechanism is shown as was described above, however, a second detent stop pin 75 has been positioned between plates 23 and 24. This second stop pin 75 may be positioned as shown in FIG. 3 to provide a recognizable increase in torque upon reaching the "low idle" position or at some other intermediate position between "low idle" and "high idle".

The structure of this detent stop pin is particularly adaptable to vehicles and further is compact in form while allowing a degree of resiliency not heretofore attained by use of various C-shaped resilient members. It is to be understood while this invention has been described with respect to a particular application, that is, toward an engine governor, the detent mechanism is equally applicable to other control shafts requiring stop means. Such modifications are considered within the realm of the specification.

The embodiments of the invention in which an exclusive property or privilege is claimed are defined as follows:

1. An adjustable detent assembly comprising:
    a housing;
    a control shaft mounted in said housing and rotatable in first and second directions;
    collar means fixedly associated with said control shaft for rotation therewith, said collar means having first and second radially extending projections, said first projection defining a radially oriented bore;
    detent means reciprocally movable in the radially oriented bore;
    resilient means mounted in said collar means for urging said detent means radially outwardly;
    fixed stop means for limiting rotation of said control shaft in said first direction;
    adjustable stop means for limiting rotation of said shaft in said second direction;
    detent stop means positionable circumferentially relative said shaft and cooperating with said detent means for providing opposition to rotation of said collar means by the control shaft.

2. The assembly set forth in claim 1, wherein said collar means comprises a collar member affixed to said shaft for rotation therewith and having one surface normal to the axis of said shaft, said collar member defining an arcuate groove in the one surface;

and further wherein said resilient means comprises an arcuate resilient member disposed in said arcuate groove, and further wherein said detent means comprises a detent pin reciprocally disposed in said bore and urged outwardly therefrom by the arcuate resilient member and means for retaining said detent pin in the said bore.

3. The assembly set forth in claim 2, wherein said detent stop means comprises:

first and second plate members disposed on opposite sides of the collar means and rotatable about the shaft;

a detent stop pin fixedly associated with said plate members and in general parallel alignment with said shaft, said detent stop pin engagable by the detent pin; and adjustable means for rotating said first and second plate members in first and second directions about said shaft.

4. The assembly set forth in claim 3, wherein the fixed stop means are integrally formed with the housing and further wherein the fixed stop means are engageable by the second radially extending projection of the collar means;

and further wherein the adjustable stop means is associated with the housing and engageable by the first radially extending projection of the collar means.

5. The assembly set forth in claim 4, wherein the adjustable stop means comprises:

a pivot pin interconnecting the first and second plate members, the pivot pin having an enlarged center portion defining a threaded transverse bore, and bolt means threadably disposed in said threaded transverse bore and associated with said housing and rotatable in first and second directions to move said pivot pin circumferentially about the control shaft.

6. The assembly set forth in claim 5, wherein the housing defines a bore and further wherein the bolt means comprises:

a bolt member having an enlarged head and a threaded shank, and a helical spring, the bolt member disposed with the head extending out of said housing and with the threaded shank disposed through said bore, and threadably disposed in the transverse bore at the pivot pin, said helical spring disposed about said threaded shank between said housing and said pivot pin.

7. The assembly set forth in claim 6, further comprising cover means fixable to the housing for preventing rotation of the bolt member.

8. An adjustable detent assembly comprising:

a housing;

a control shaft mounted in said housing and rotatable in first and second directions.

a collar member affixed to said shaft for rotation therewith and having one surface normal to the axis of said shaft, said collar member defining an arcuate groove in the one surface, said collar member having first and second radially extending projections, said first projection defining a radially oriented bore;

an arcuate resilient member disposed in said arcuate groove;

a detent pin reciprocally disposed in said radially oriented bore, said detent pin urged outwardly therefrom by said arcuate resilient member;

means for retaining said detent pin in said bore;

fixed stop means for limiting rotation of said control shaft in said first direction;

adjustable stop means for limiting rotation of said shaft in said second direction;

detent stop means positionable circumferentially relative said shaft and cooperating with said detent pin for providing opposition to rotation of said collar member by the control shaft; said detent stop means comprising, first and second plate members disposed on opposite sides of said collar member and rotatable about the control shaft, a detent stop pin fixedly associated with said plate members in general parallel alignment with said control shaft, said detent stop pin engagable by said detent pin, and adjustable means for rotating said first and said second plate members in first and second directions about said control shaft.

* * * * *